United States Patent [19]

Mignen

[11] 4,118,853
[45] Oct. 10, 1978

[54] METHOD OF MAKING AN OPHTHALMIC LENS OF PROGRESSIVELY VARIABLE FOCAL POWER

[75] Inventor: Bernard Mignen, Saint-Maur, France

[73] Assignee: Essilor International, Cie Generale d'Optique, Joinville-le-Pont, France

[21] Appl. No.: 733,700

[22] Filed: Oct. 19, 1976

[30] Foreign Application Priority Data

Oct. 30, 1975 [FR] France .............................. 75 33143

[51] Int. Cl.² ............................................. B29D 11/00
[52] U.S. Cl. ..................................... 29/424; 29/527.1; 29/559; 51/216 LP; 264/1; 351/169
[58] Field of Search ............... 264/1; 65/61; 29/527.1, 29/559, 424; 51/216 LP, 284, 284 E, 217; 351/169

[56] References Cited

U.S. PATENT DOCUMENTS

| 937,763 | 10/1909 | Buchhop | 51/216 LP |
|---|---|---|---|
| 3,079,736 | 3/1963 | Kratt | 51/217 L |
| 3,227,507 | 1/1966 | Feinbloom | 264/1 |
| 3,750,272 | 8/1973 | Gomond | 51/284 E |
| 4,018,587 | 4/1977 | Maitenaz | 264/1 |

FOREIGN PATENT DOCUMENTS

963,407   7/1964   United Kingdom ...................... 51/284

Primary Examiner—James B. Lowe
Attorney, Agent, or Firm—Charles E. Brown

[57] ABSTRACT

The invention relates generally to the production of ophthalmic lenses having, on one face, an active zone of progressively variable radius of curvature.

According to the invention, when the blank from which such a lens is obtained is being cast, there is formed, on the periphery of its active zone, an edge region or facet extending continuously and circularly right round the said active zone for the subsequent support of the mould which is used to enable a gripper block to be cast on the face of the blank so as to enable a second machining operation to be carried out on the opposite face of the blank.

7 Claims, 9 Drawing Figures

METHOD OF MAKING AN OPHTHALMIC LENS OF PROGRESSIVELY VARIABLE FOCAL POWER

BACKGROUND OF THE INVENTION

1. Field of the Invention

The present invention relates, in general terms, to the production of ophthalmic lenses of progressively variable focal power, that is to say ophthalmic lenses of the type in which at least one of the faces has a zone of progressively variable curvature on at least one side of at least one central line, referred to below as active zone for the sake of simplicity of expression; more particularly, the invention is concerned with those of this type of ophthalmic lens which are made from organic materials.

2. Description of the Prior Art

As is known, organic materials used for ophthalmic lenses readily lend themselves to a process whereby the desired profile of the lenses, which it is desired to obtain, can be directly arrived at by casting between two casting dies which have been suitably machined and buffed, in contradistinction to mineral glass which, after casting, usually required a three-stage operation of rough grinding, buffing and honing.

With respect to the casting from organic material of ophthalmic lenses having progressively variable focal power, it is usual to proceed through the intermediary of a semi-finished circular blank, one of whose faces, which is more usually the convex face, is given through casting the desired active zone with a progressively variable radius of curvature. The other face of the blank is cast with an initial, generally spherical, shape and has to be given a second machining operation such as to give it the configuration (for example cylindrical, toroidal or some other shape), which is suitable for other defects of vision from which the different patients in question may suffer, by a similar variation of focal power.

Indeed, it is more economic — taking into account firstly, the difficulties of obtaining an active zone of progressively variable focal power and, secondly, the diversity, qualitatively and quantitatively, of the different possible corrections of vision — to produce a reduced number of semi-finished lens blanks covering, by their finished face, the possible range of progressively variable focal power and then to adapt these blanks by machining their other face, to the different instances of practical usage which prove to be necessary.

For the second machining operation carried out on one of the faces of these semi-finished blanks, it is usual to mount a gripper block on the other face, by cooling a low melting point material between the said face and a bell-shaped mould which is open towards this face, the gripper block being such as to enable the blank to be suitably held and then positioned on a machine tool.

After the face in question (that is to say the face lying opposite that bearing the gripper block) has been machined to the desired profile, the gripper block is removed by melting it.

However, with regard to the production of lenses of progressively variable focal power, the bell-shaped mould suitable for casting a gripper block on the semi-finished circular blanks in question should, for reasons stated above, be applied to the finished face of these blanks comprising the active zone of progressively variable radius of curvature.

The result of this is — taking into account, firstly, the variations of curvature at the periphery of the face in question of these blanks, these variations differing from one blank to another, and, secondly, taking into account the shape (usually that of a body of revolution) of the bell-shaped mould which is used without distinction for casting a gripper block on the finished face of any of these blanks — that, when the free edge of this mould is applied to the surface of a blank, the seal provided by the two mating surfaces is not a sufficiently intimate one, at all points on the surface of the blank, to prevent at least local leakage of the low melting point material, which normally has to be confined when the blank is being cast.

In order to remedy this drawback it has already been proposed, more specifically for making ophthalmic lenses of mineral glass, to interpose, between the bell-shaped mould and the face of the semi-finished blank, a fitting ring having a free edge which is complementary to the edge of this mould, at a free edge which is complementary to the face concerned of the blank. A fitting ring of this kind is delivered, together with the blank, to the operative who is to machine the blank.

In addition to the fact that this provision, although it is very suitable in the case of ophthalmic lenses of mineral glass, requires the manufacture and supply, for each semi-finished lens blank of a fitting ring adapted to the progressive face of the blank, this provision does not share, in the case of ophthalmic lenses of organic material, the casting facilities available to these ophthalmic lenses.

A first object of this invention is the provision of a method which, by way of contrast, enables the use of a fitting ring of this kind to be dispensed with when a gripper block is being cast on the progressively variable face of a semi-finished lens blank, the other face of which is to be machined.

SUMMARY

In the method according to the invention for producing an ophthalmic lens of progressively variable focal power, particularly from organic material, there is obtained, by casting a material of this kind between two casting dies, a semi-finished lens blank having at least one face with an active zone having a progressively variable radius of curvature, on at least one side of at least one central line. A gripper block is applied, on the face in question of the said blank, by casting a low melting point material between the said face and a bell-shaped mould open towards this face, which gripper block enables the blank to be securely held whilst the face of this blank lying opposite the face bearing the gripper block is machined to the desired profile, and the gripper block is subsequently removed by melting. The method is characterized in that, when the blank is being cast, there is formed, at the periphery of the active zone of the said one face of the disc, an edge facet which extends, continuously and circularly, the whole way round the active zone, and which is thus suitable for forming a supporting face on which the bell-shaped mould can be directly applied by its free edge, in a tight-sealing manner.

Thus, there is no need, with concomitant advantage, to interpose any fitting ring between the bell-shaped mould used and the face of the blank to which the said mould is applied.

Furthermore, the edge facet provided for this purpose according to the invention is directly formed at the casting stage, so that the sole requirement is a single machining operation carried out on the casting die in question.

It is true that it has already been proposed, in particular in French Pat. No. 74 11177 of the Mar. 29, 1974 (which concerns the casting of progressive ophthalmic lenses of organic glass), to form an edge facet at the periphery of that casting die which corresponds to the progressive face of this lens.

Thus, in this case, this edge facet is provided to allow support of the sealing element usually interposed between the two casting dies, so that it only constitutes, at least locally, a radial prolongation which just suffices to provide a suitable support for the corresponding lip of a sealing element of this kind, which lip is, for this purpose, made complementary to the said edge facet.

In contradistinction to the subject matter described above, according to the invention the said edge facet is given a radial dimension which suffices to assure that, at all points of the sealing element, this edge facet extends radially inwardly beyond the sealing element.

Thus, there is, according to the invention and insofar as this edge facet is concerned, not only a difference with respect to the purpose sought after in the use of this edge facet but also a difference with respect to the radial extent of this facet.

A further aspect of the subject matter of this invention is a lens blank of organic glass suitable for producing an ophthalmic lens of progressively variable focal power, obtained as a semi-finished product, from implementing the method outlined above.

This blank, which is of the kind in which at least one face has an active zone with a progressively variable radius of curvature on at least one side of at least one central line, is generally characterized by an edge facet which extends continuously and circularly the whole way round the said active zone.

It is true that, in the case where, as mentioned above, it is usual to form at the periphery of the casting die corresponding to the progressive face of the disc to be cast a contact facet suitable for supporting a sealing element to be interposed between this casting die and the associated casting die; the blank thus obtained may comprise an edge facet at the periphery of its active zone, due to the fact that the lip of the sealing element used usually has a similar magnitude or radial extent the whole length of its perimeter, and also due to the fact that, by contrast, the contact facet formed on the casting die concerned has a magnitude of radial extent which varies owing to the variation of curvature of the active zone which it surrounds.

However, in this case, the edge facet extends over only part of the active zone of its progressive face.

Again it is true that it is already known to provide at the periphery of the active zones of lenses intended for equipping lenses, facets which have a continuous circular contour and which are intended, firstly to lighten lenses of this kind — these lenses having appreciable thickness at their center — and, secondly, to allow them to be mounted in a practical manner in the frames of spectacles.

However, in this case these lenses do not comprise semi-finished blanks but rather finished lenses, that is to say lenses in which both faces are machined to the required profile and, secondly these lenses do not have one face which is progressive.

DESCRIPTION OF THE PREFERRED EMBODIMENT

Figure 1:
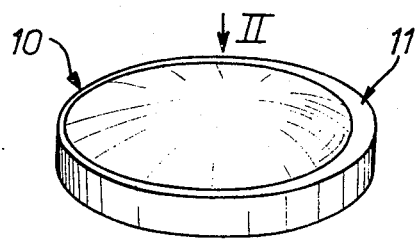
FIG. 1 is a perspective view of a semi-finished circular lens blank according to the invention.
Figure 2:
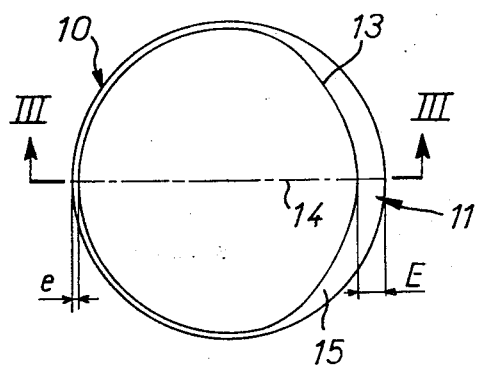
FIG. 2 is a plan view of this blank, as seen in the direction of arrow II of FIG. 1.
Figure 3:
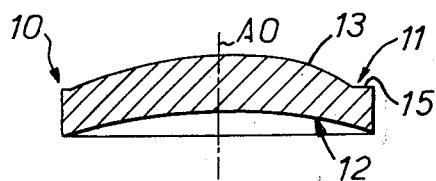
FIG. 3 is an axial cross-section of the blank, taken along the line III—III of FIG. 2.

Referring to the embodiment of FIGS. 1 to 3, a semi-finished, circular lens blank 10 according to the invention — which is intended to form an ophthalmic lens of progressively variable focal power — has one face, which will be referred to as finished and which alone assures the progressivity of focal power sought after, and an opposite face, referred to as semi-finished, which is neutral from this point of view; this second face preferably has the shape of a body of revolution (for example it is spherical).

In the embodiment illustrated the finished face is the convex face 11 of the blank 10, while the semi-finished face of blank 10 is the concave face 12.

Thus, in its central portion, the convex face 11 of the blank 10 has an active zone 13, whose radius of curvature is progressively variable on at least one side of at least one central line 14. In practice, and in a conventional manner, the variations of curvature concern a band of central lines extending on each side of a central line 14, the latter being intended to represent the central vertical line of the final ophthalmic lens; this variation of curvature is only substantially developed in the lower half of these central lines.

These provisions are known per se, and will not be described in detail here.

According to the invention an edge facet 15 peripherally delimits the active zone 13, and extends continuously and following the contour of a circle, right round this active zone.

In practice, and as illustrated, the magnitude of radial extent of this edge facet 15 lies between a minimum value e and a maximum value E, each corresponding to the ends of the main central line 14, by reason of the variation of curvature along this line 14.

In practice, and for reasons which will be given below, the minimum value e is preferably at least 1 mm; however, the invention is not restricted to this value.

The edge facet 15 has, in the embodiment shown in FIGS. 1 to 6, a plane configuration and extends substantially perpendicularly of the optical axis AO of blank 10 (FIG. 3).

Figure 4:
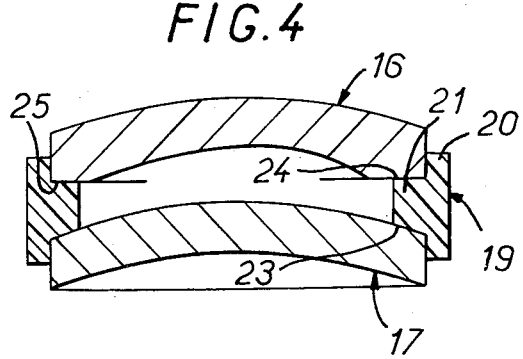
FIG. 4 is an axial cross-section of the casting dies suitable for casting the blank.

This blank 10 can easily be made from organic material by directly casting the material to the desired profile between two casting dies 16, 17, which have been suitably machined (FIG. 4).

In conventional manner, a sealing element 19 is inserted between the casting dies, this sealing element 19 comprising a cylindrical skirt 20, adapted to surround the periphery of the casting dies, and, located at the central zone of the internal surface of this skirt, a lip 21 which projects radially inwardly from the inner surface of the skirt, the side faces of lip 21 being adapted to come into abutting contact with the cooperating edges of the casting dies 16, 17.

Insofar as the casting die 17 (corresponding to the semi-finished concave face 12 of disc 10) is concerned, the casting surface of this die 17 usually has the shape of a body of revolution (for example a circle), and it is a simple matter to give a complementary shape to the corresponding transverse face 23 of lip 21 of the sealing element 19.

By way of contrast, insofar as the casting die 16 (corresponding to the progressive convex face 13) is concerned, it would be difficult, due to the progressivity of this surface, to give a complementary shape to the corresponding transverse face of the lip 21.

For this reason provision is made, in a conventional manner, to provide, at the periphery of this casting die 16, a plane facet 25 which circularly surrounds the zone of the casting surface of this die 16 corresponding to the active zone 13 of the disc which it is intended to obtain; the corresponding transverse face 24 of lip 21 of sealing element 19 can then, conveniently, be plane itself.

However, according to the invention, this facet 25 of die 16 has a sufficiently large radial dimension to ensure that — at all points of the sealing element 19, and more particularly at all points of the lip 21 of sealing element 19 — this facet 25 will extend radially inwardly beyond sealing element 19, as will be apparent from FIG. 4.

Thus, this facet 25 is, considered as a whole, adapted to engage lip 21 of sealing element 19 and, beyond lip 21, is adapted to form the edge facet 15 provided, according to the invention, on the blank 10 which is to be formed.

This blank can — in instances where the patients, whose sight requires the corresponding progressivity of focal power, do not suffer from other anomalies of vision — be directly used for obtaining an ophthalmic lens which is suitable for such patients, simply by trimming and machining the shape of the blank.

However, as has been stated above, the concave neutral face 12 has to be subjected to a second operation when these patients have other defects of vision which have to be corrected.

Figure 5:
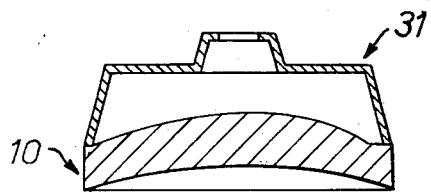
FIG. 5 is an axial cross-section illustrating the casting of a gripper block on the progressive face of a semi-finished lens blank according to the invention.
Figure 6:
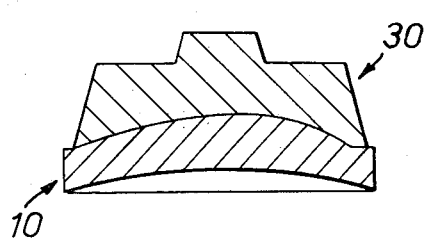
FIG. 6 is an axial cross-section of the blank fitted with a gripper block.

It is usual, for machining this face 12, to mount a gripper block 30 onto the progressive convex face 11 by casting a material having a low melting point, between this face 12 and a bell-shaped mould 31, which is applied by its edge to the periphery of the face 12 (FIGS. 5 and 6).

As these expedients are well known per se, they will not be described in detail now.

It suffices to point out that, by virtue of the provision of the edge facet 15 which, according to the invention, the blank 10 includes around its active zone 13, the bell-shaped mould 31 (which is usually a body of revolution) can be directly applied to the face 11 of the blank without the interposition of any fitting ring.

Indeed, it suffices if the free edge of the mould 31 simply has a plane shape, as will be the face for the embodiment of FIGS. 1 to 3.

As mentioned above, the radial dimension of the edge facet 15 is preferably at least 1 mm; this is to ensure that the free edge of mould 31 will be supported, reliably and effectively against the edge facet 15 over the whole length of the facet.

Figure 7:
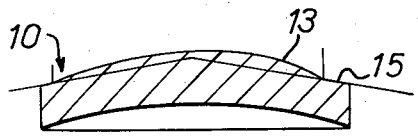
FIGS. 7 and 8 are axial cross-sectional views, similar to those of FIG. 3, each illustrating a separate embodiment.
Figure 8:
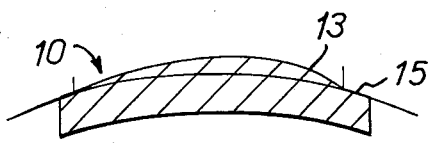

According to the modifications illustrated in FIGS. 7 and 8, the edge facet 15 of blank 10 has, according to the invention, the shape of a body or revolution, for example a conical shape (FIG. 7) or a spherical shape (FIG. 8).

At the same time, the free edge of the bell-shaped mould 31 has complementary configuration (not shown).

Figure 9:
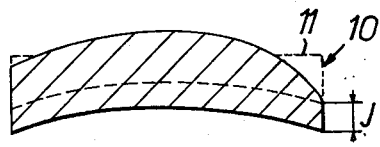
FIG. 9 is an axial cross-sectional view, similar to that of FIG. 3, and shows a semi-finished lens blank of the prior art.

FIG. 9 illustrates a further advantage of the invention. In FIG. 9 a semi-finished blank of known kind is shown in a continuous line, for an ophthalmic lens of progressively variable power, while the corresponding semi-finished blank 10 according to the invention is shown in broken lines.

Insofar as the semi-finished blank of the prior art is concerned, it is usual — for the convenience of machining of the moulds used for casting such a blank — to arrange for the progressive surface of such a blank to extend over the whole of the convex face of the disc. It is necessary to avoid a dangerous thinning of such a blank opposite the portion of this progressive surface whose radius of curvature is the smallest — to give the whole of the blank an excess thickness J, which increases, without advantage, the amount of raw material used, and also increases, to a corresponding degree, the time subsequently needed to machine the concave face of the concave face of the disc.

By automatically limiting the zone over which this progressive surface extends, the edge facet 11 according to the invention enables this excess J to be dispensed with so that, other things being equal, a semi-finished blank according to the invention will be lightened with respect to a comparable semi-finished blank of the prior art.

Of course, the present invention is not restricted to the embodiment described, nor to the forms of implementation of the invention described above, but comprehends all modifications thereof within the scope of the appended claims.

In particular, the concave face of the blank could comprise an active zone of progressively variable radius of curvature, so as to complement the active zone of the convex face of this blank and/or so as to replace the active zone of the convex face.

I claim:

1. A method of producing an ophthalmic lens of progressively variable focal power, in which a semi-finished blank is first obtained by casting an organic material between two casting dies, at least one of the faces of the blank having an active zone of progressively variable radius of curvature on at least one side of at least one central line, a gripper block for holding the blank is mounted on the said face of the blank by casting a material of low melting point between the said face and a bell-shaped mold which is open towards the said face, and the face of the blank lying opposite to that on which said gripper block is mounted is machined to the desired profile, the gripper block being subsequently removed by melting, wherein the improvement resides in forming at the periphery of the active zone of the said face of the blank, when the blank is cast an edge facet which extends continuously and circularly around the whole of the active zone to form a supporting face, providing the mould with a continuous free edge, and applying the free edge of the mold directly to the lens blank supportive face to form a tight seal therebetween.

2. A method as claimed in claim 1, in which in the molding of the lens blank a sealing member is interposed between the casting dies, the sealing member having a plane surface which is in contact with the casting die corresponding to said at least one lens blank face, the last mentioned casting die has a plane facet having a radial dimension at all points thereof such that the plane facet extends radially inwardly of the sealing member.

3. A method of making ophthalmic lenses having a progressively variable focal power, comprising the steps of molding a blank of organic material having on at least one of its faces an active zone of progressive variable radius of curvature and a continuous annular marginal zone extending around the entire active zone and defining a combined sealing and support surface, bringing a gripper block mold having a free sealing edge into position over the active zone of said one face and placing the free sealing edge of the mold into direct sealing engagement with said combined sealing and support surface to provide fluidtight contact therebetween, introducing low melting point material into the mold to form on said one face of the lens blank a gripper block for holding the same during machining, machining the other face of the lens blank to the desired profile and then melting the gripper block from the machine lens.

4. A method as claimed in claim 3, wherein said combined support and sealing surface is formed to be of variable radial extent but at all points to be equal to or greater than the radial extent of the free sealing edge of the mold.

5. A method as claimed in claim 4, wherein the support and sealing surface is formed to be generally plane.

6. A method as claimed in claim 4, wherein the support and sealing surface is formed to be part spherical.

7. A method as claimed in claim 4, wherein the support and sealing surface is formed to be part conical.

* * * * *